(12) United States Patent
Park et al.

(10) Patent No.: US 12,321,382 B2
(45) Date of Patent: Jun. 3, 2025

(54) METHOD AND APPARATUS FOR IDENTIFYING MUSIC IN CONTENT

(71) Applicant: ELECTRONICS AND TELECOMMUNICATIONS RESEARCH INSTITUTE, Daejeon (KR)

(72) Inventors: Jee Hyun Park, Daejeon (KR); Jung Hyun Kim, Daejeon (KR); Hye Mi Kim, Daejeon (KR); Yong Seok Seo, Daejeon (KR); Dong Hyuck Im, Daejeon (KR); Won Young Yoo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 700 days.

(21) Appl. No.: 17/681,416

(22) Filed: Feb. 25, 2022

(65) Prior Publication Data

US 2023/0153351 A1    May 18, 2023

(30) Foreign Application Priority Data

Nov. 16, 2021   (KR) .................. 10-2021-0157237

(51) Int. Cl.
*G06F 16/683*    (2019.01)
*G06F 16/61*    (2019.01)
*G10H 1/00*    (2006.01)

(52) U.S. Cl.
CPC ............ *G06F 16/683* (2019.01); *G06F 16/61* (2019.01); *G10H 1/0008* (2013.01);
(Continued)

(58) Field of Classification Search
CPC ..... G06F 16/683; G06F 16/61; G10H 1/0008; G10H 1/0041; G10H 2210/031;
(Continued)

(56) References Cited

U.S. PATENT DOCUMENTS 7,487,180 B2 * 2/2009 Holm ................ G06F 16/634
707/999.009
10,089,994 B1 * 10/2018 Radzishevsky ....... G10L 21/038
(Continued)

FOREIGN PATENT DOCUMENTS

KR     101315970 B1 * 10/2013
KR     101608849 B1    4/2016
(Continued)

OTHER PUBLICATIONS

The Request for the Submission of an Opinion for Korean Patent Application No. 10-2021-0157237, dated Apr. 17, 2023.
(Continued)

*Primary Examiner* — Christina M Schreiber

(57) ABSTRACT

The present invention relates to an apparatus and method for identifying music in a content, The present invention includes extracting and storing a fingerprint of an original audio in an audio fingerprint DB; extracting a first fingerprint of a first audio in the content; and searching for a fingerprint corresponding to the fingerprint of the first audio in the audio fingerprint DB, wherein the first audio is audio data in a music section detected from the content.

14 Claims, 12 Drawing Sheets

(52) U.S. Cl.
CPC ..... *G10H 1/0041* (2013.01); *G10H 2210/031* (2013.01); *G10H 2240/075* (2013.01); *G10H 2240/095* (2013.01); *G10H 2240/135* (2013.01); *G10H 2240/141* (2013.01); *G10H 2250/311* (2013.01)

(58) Field of Classification Search
CPC ....... G10H 2240/075; G10H 2240/095; G10H 2240/135; G10H 2240/141; G10H 2250/311
USPC ............................................................ 84/624
See application file for complete search history.

(56) References Cited

U.S. PATENT DOCUMENTS

| | | | | |
|---|---|---|---|---|
| 10,936,651 | B2* | 3/2021 | Coover | G06F 16/683 |
| 2006/0155399 | A1* | 7/2006 | Ward | G10L 25/48 |
| | | | | 704/E11.002 |
| 2013/0318071 | A1* | 11/2013 | Cho | G06F 16/60 |
| | | | | 707/722 |
| 2015/0325252 | A1* | 11/2015 | Peng | G10L 19/018 |
| | | | | 704/226 |
| 2017/0249957 | A1* | 8/2017 | Park | G10L 25/51 |
| 2019/0213279 | A1* | 7/2019 | Kim | G06F 16/632 |
| 2020/0081914 | A1* | 3/2020 | Scott | G06F 18/2115 |
| 2020/0183973 | A1* | 6/2020 | Balcers | G10L 19/018 |
| 2022/0286737 | A1* | 9/2022 | Hodges | G11B 27/28 |
| 2022/0319551 | A1* | 10/2022 | Haro | H04N 21/8106 |
| 2023/0153351 | A1* | 5/2023 | Park | G06F 16/61 |
| | | | | 707/769 |

FOREIGN PATENT DOCUMENTS

| | | | | |
|---|---|---|---|---|
| KR | 101647012 | B1 | 8/2016 | |
| KR | 101841983 | B1 | 5/2018 | |
| KR | 10-2019-0051261 | A | 5/2019 | |
| KR | 10-20200045976 | A | 5/2020 | |
| KR | 20210047614 | A | 4/2021 | |
| KR | 20210053762 | A | 5/2021 | |
| WO | WO-2008127052 | A1 * | 10/2008 | ....... G06F 17/30743 |
| WO | WO-2023079367 | A1 * | 5/2023 | ........... G06V 10/761 |

OTHER PUBLICATIONS

Hyemi Kim et al., "Monaural Music-Speech Source Separation Based on Convolutional Neural Network for Background Music Identification in TV Shows", The Journal of Korean Institute of Communications and Information Sciences, 2020, '20-05 vol. 45 No. 05.

* cited by examiner

METHOD AND APPARATUS FOR IDENTIFYING MUSIC IN CONTENT

CROSS REFERENCE TO RELATED APPLICATION

The present application claims priority to a KR application 10-2021-0157237, filed Nov. 16, 2021, the entire contents of which are incorporated herein for all purposes by this reference.

BACKGROUND OF THE INVENTION

Field of the Invention

The present disclosure relates to an apparatus and method for identifying music in a content. More particularly, the present disclosure relates to a music identification apparatus and method which automatically recognize background music used in a content and automatically generate details of the used background music.

Description of the Related Art

In various contents including video contents like films and TV programs such as dramas and news and audio contents like radio programs, music is inserted to emphasize a particular atmosphere of a work or to increase a feeling. A technology of extracting information on audio features is used to identify such music, and representative techniques use a peak value of a spectrogram, an energy difference between audio frequency subbands, a wavelet calculation for an audio spectrogram image, the centroid of energy for each audio frequency subband, and the like.

Meanwhile, music in a content is played alone sometimes, but when music plays a supporting role in a content, the music is mixed with other sounds like dialogs in the content so that it does not come to the front. In the latter case, the music is background music, which is played for a relatively short time and is often synthesized as a whispering sound.

However, the conventional techniques mentioned above provide a low accuracy in case that background music is played with overlapping other audio data. Accordingly, as background music played in a content, but mixed with various background noises, cannot maintain the pure characteristic of music itself, a technique is needed to know a section using the music in a whole content section and to identify every piece of background music used in the content.

SUMMARY

The present disclosure is directed to provide an apparatus and method for identifying music inserted in a content.

The present disclosure is directed to provide a music identification technique that performs music preprocessing by considering damage of music.

The present disclosure is directed to provide a music identification technique capable of automatically generating details of music used in a content.

Other objects and advantages of the present disclosure will become apparent from the description below and will be clearly understood through embodiments of the present disclosure. It is also to be easily understood that the objects and advantages of the present disclosure may be realized by means of the appended claims and a combination thereof.

According to an embodiment of the present invention, a method for identifying music in a content, includes: extracting and storing a fingerprint of an original audio in an audio fingerprint DB; extracting a first fingerprint of a first audio in the content; and searching for a fingerprint corresponding to the fingerprint of the first audio in the audio fingerprint DB, wherein the first audio is audio data in a music section detected from the content.

According to an embodiment of the present invention, a method for identifying music in a content, wherein the extracting and storing of the fingerprint of the original audio in the audio fingerprint DB comprises: extracting the fingerprint of the original audio; resynthesizing after separating a music signal and a non-music signal of the original audio; and extracting a fingerprint of the resynthesized original audio.

According to an embodiment of the present invention, a method for identifying music in a content, wherein the resynthesizing comprises synthesizing by amplifying the music signal and by attenuating the non-music signal.

According to an embodiment of the present invention, a method for identifying music in a content, wherein the fingerprint of the original audio is mapped with the fingerprint of the resynthesized original audio in the audio fingerprint DB.

According to an embodiment of the present invention, a method for identifying music in a content, wherein the fingerprint of the first audio is searched both for the fingerprint of the original audio and the fingerprint of the resynthesized original audio.

According to an embodiment of the present invention, a method for identifying music in a content, wherein the fingerprint of the first audio comprises a fingerprint of a resynthesized first audio after the music signal and the non-music signal of the first audio are separated.

According to an embodiment of the present invention, a method for identifying music in a content, wherein the fingerprint of the resynthesized first audio is generated by synthesizing after amplifying the music signal and attenuating the non-music signal.

According to an embodiment of the present invention, a method for identifying music in a content, wherein the audio fingerprint DB comprises audio metadata that comprises at least one of a name of the original audio, a date of release, a singer, and a producer.

According to an embodiment of the present invention, a method for identifying music in a content, wherein the content has a mono channel, a stereo channel, or a more multichannel.

According to an embodiment of the present invention, a method for identifying music in a content, wherein the detected music section is detected using an artificial neural network in the content.

According to an embodiment of the present invention, an apparatus for identifying music in a content, the apparatus comprising: a memory configured to store data; and a processor configured to control the memory, wherein the processor is further configured to: extract and store a fingerprint of an original audio in an audio fingerprint DB, extract a fingerprint of a first audio in the content, and search for a fingerprint corresponding to the fingerprint of the first audio in the audio fingerprint DB, wherein the first audio is audio data in a music section detected from the content.

According to an embodiment of the present invention, an apparatus for identifying music in a content, wherein the processor is further configured to: extract the fingerprint of the original audio, resynthesize after separating a music signal and a non-music signal of the original audio, and extract a fingerprint of the resynthesized original audio.

According to an embodiment of the present invention, an apparatus for identifying music in a content, wherein the processor is further configured to, during the resynthesis, synthesize by amplifying the music signal and attenuating the non-music signal.

According to an embodiment of the present invention, an apparatus for identifying music in a content, wherein the processor is further configured to map the fingerprint of the original audio with the fingerprint of the resynthesized original audio.

According to an embodiment of the present invention, an apparatus for identifying music in a content, wherein the processor is further configured to, when searching for the fingerprint of the first audio, search both for the fingerprint of the original audio and for the fingerprint of the resynthesized original audio.

According to an embodiment of the present invention, an apparatus for identifying music in a content, wherein the fingerprint of the first audio comprises a fingerprint of a resynthesized first audio after the music signal and the non-music signal of the first audio are separated.

According to an embodiment of the present invention, an apparatus for identifying music in a content, wherein the fingerprint of the resynthesized first audio is generated by synthesizing after amplifying the music signal and attenuating the non-music signal.

According to an embodiment of the present invention, an apparatus for identifying music in a content, wherein the content has a mono channel, a stereo channel, or a more multichannel.

According to an embodiment of the present invention, an apparatus for identifying music in a content, wherein the detected music section is detected using an artificial neural network in the content.

According to an embodiment of the present invention, a computer program stored in a non-transitory computer-readable medium, the computer program implementing in a computer: extracting and storing a fingerprint of an original audio in an audio fingerprint DB; extracting a first fingerprint of a first audio in a content; and searching for a fingerprint corresponding to the fingerprint of the first audio in the audio fingerprint DB, wherein the first audio is audio data in a music section detected from the content.

According to the present disclosure, music played with other noises may be identified more accurately.

According to the present disclosure, details of use of music available to calculate royalty may be generated more accurately by identifying music.

Effects, which may be obtained from embodiments of the present disclosure, are not limited to the above-mentioned effects, and other effects not mentioned herein may be clearly understood based on the following description of the embodiments of the present disclosure by those skilled in the art to which a technical configuration of the present disclosure is applied. Effects not intended by performing a configuration described in the present disclosure may also be derived from the embodiments of the present disclosure by those skilled in the art.

DETAILED DESCRIPTION

Figure 1:
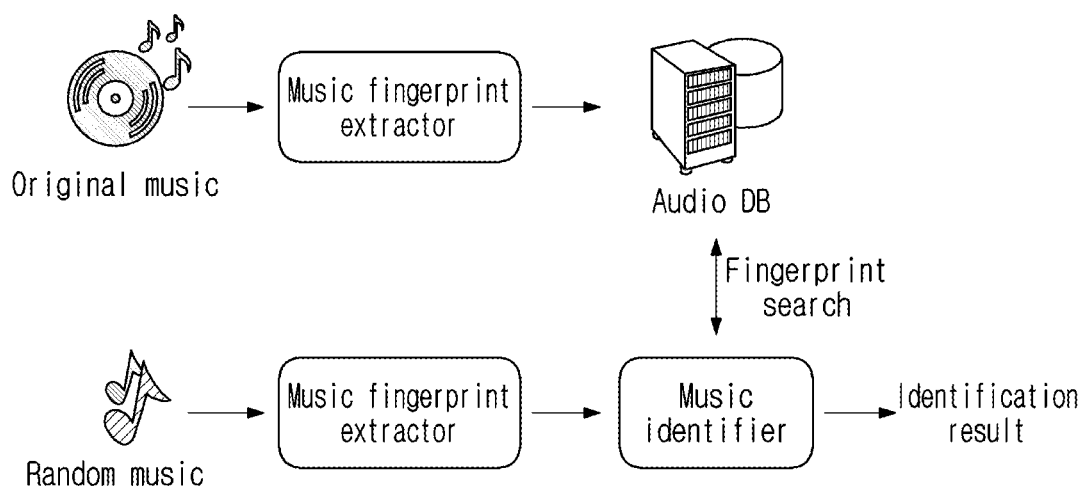
FIG. 1 is a diagram illustrating a configuration of a music identification system based on an audio fingerprint.

Hereinafter, embodiments of the present disclosure will be described in detail with reference to the accompanying drawings so that those of ordinary skill in the art to which the present disclosure pertains can easily implement them. However, the present disclosure may be implemented in several different forms and is not limited to the embodiments described herein.

In describing an embodiment of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, the components that are distinguished from each other are for clearly explaining each characteristic, and the components do not necessarily mean that the components are separated. That is, a plurality of components may be integrated to form one hardware or software unit, or one component may be distributed to form a plurality of hardware or software units. Accordingly, even if not specifically mentioned, such integrated or distributed embodiments are also included in the scope of the present disclosure.

In the present disclosure, components described in various embodiments do not necessarily mean essential components, and some may be optional components. Accordingly, an embodiment composed of a subset of components described in an embodiment is also included in the scope of the present disclosure. In addition, embodiments including other components in addition to components described in various embodiments are also included in the scope of the present disclosure.

Hereinafter, in describing embodiments of the present disclosure, content includes video content, audio content, music content, and the like.

Hereinafter, in describing embodiments of the present disclosure, audio data includes original audio data and audio data included in content.

Hereinafter, in describing the embodiments of the present disclosure, an audio fingerprint may be mixed with an audio feature point, audio feature information, audio DNA, and the like.

Hereinafter, in describing embodiments of the present disclosure, the audio DB includes an audio fingerprint DB.

Hereinafter, the present disclosure will be described in detail with reference to the drawings.

FIG. 1 is a diagram illustrating a configuration of a music identification system based on an audio fingerprint. Specifically, FIG. 1 is a view for schematically describing a method for identifying music in a content according to the present disclosure.

A music identification system based on an audio fingerprint may include a music fingerprint extractor, a music identifier, and an audio fingerprint database (DB).

First, an audio fingerprint may be extracted from numerous original music contents, which are search targets, by using the music fingerprint extractor, and may be stored in the audio fingerprint DB. Next, in order to identify unknown music, an audio fingerprint for the unknown music may be extracted by using the fingerprint extractor, and a corresponding audio fingerprint may be searched for in the audio fingerprint DB by using the music identifier.

In order to further improve accuracy in identifying music in a content where other sounds are mixed, a process of extracting an audio fingerprint and a detailed process of searching for an audio fingerprint, as proposed in the present disclosure, will be described in further detail below with reference to another drawing.

Figure 2:
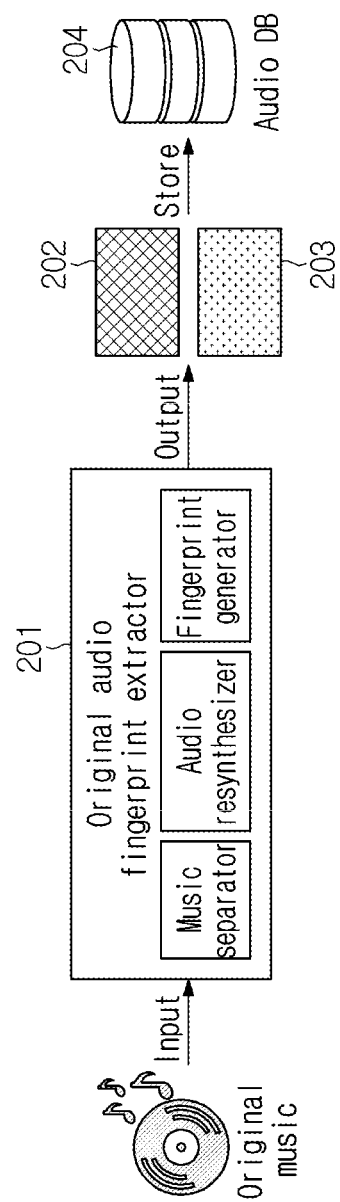
FIG. 2 is a diagram illustrating a configuration of an original audio fingerprint extractor according to an embodiment of the present disclosure.
Figure 3:
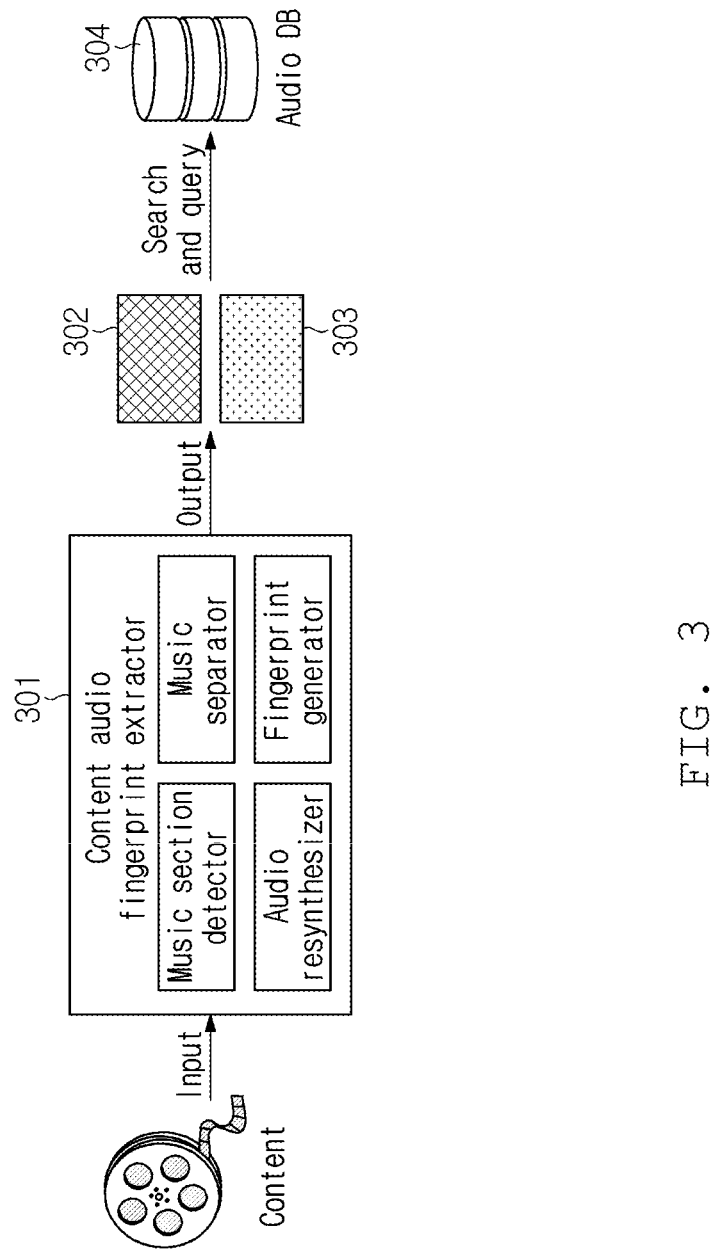
FIG. 3 is a diagram illustrating a configuration of a content audio fingerprint extractor according to an embodiment of the present disclosure.

FIG. 2 is a diagram illustrating a configuration of an original audio fingerprint extractor according to an embodiment of the present disclosure, and FIG. 3 is a diagram illustrating a configuration of a content audio fingerprint extractor according to an embodiment of the present disclosure.

An original audio fingerprint extractor 201 according to the present disclosure may extract an original audio fingerprint to be stored and managed in an audio fingerprint DB 204, and a content audio fingerprint extractor 301 may extract a fingerprint from an audio in a content.

As an example, first, the original audio fingerprint extractor 201 may extract a fingerprint of an original audio. In addition, the original audio fingerprint extractor 201 may include a music separation unit (separator) capable of separating a music signal and a non-music signal in the original audio, an audio resynthesizer capable of resynthesizing the separated music signal and non-music signal, and a fingerprint generation unit (generator) capable of generating a fingerprint for resynthesized original audio data. According to the original audio fingerprint extractor, a fingerprint 202 of the original audio may be extracted as it is, or a fingerprint 203 of the original audio, which is resynthesized by the music separator, the audio resynthesizer and the fingerprint generator, may be extracted, and at least one of the original audio fingerprint 202 and the resynthesized original audio fingerprint 203 may be stored in an audio fingerprint DB 204. As an example, when both the fingerprints 202 and 203 are stored and managed in the audio fingerprint DB, they may be managed by being mapped with each other with respect to the same original audio data.

As an example, a content audio fingerprint extractor 301 of FIG. 3 may extract a fingerprint of an audio in a content. In an embodiment, as for an audio in a content, same music may be played across a whole section, however, on the other hand, since different pieces of music may be played in many sections of the content, first finding a section in which music is played may be efficient in identifying the music in the content. Accordingly, the content audio fingerprint extractor 301 may include a music section detection unit (detector) capable of detecting a section in which music is played in a content. In an embodiment, an artificial neural network may be utilized to detect a section in which music is played in a content. For example, a deep learning technique may be utilized.

In addition, the content audio fingerprint extractor 301 may include a music separation unit (separator) capable of separating a music signal and a non-music signal in a detected music section, an audio resynthesizer capable of resynthesizing the separated music signal and non-music signal, and a fingerprint generation unit (generator) capable of generating a fingerprint based on resynthesized audio data in content. According to the content audio fingerprint extractor 301, a fingerprint 302 for content audio data itself may be extracted, and a fingerprint 303 for resynthesized content audio data may be extracted. In addition, at least one of the fingerprint 302 and the fingerprint 303 may be used to search for a corresponding fingerprint in an audio fingerprint DB 304. In an embodiment, a fingerprint search may be performed for the fingerprint 202 of original audio data and/or the fingerprint 203 of resynthesized original audio data. In an embodiment, the audio fingerprint DB 304 may be the same as the audio fingerprint DB 204.

Figure 12:
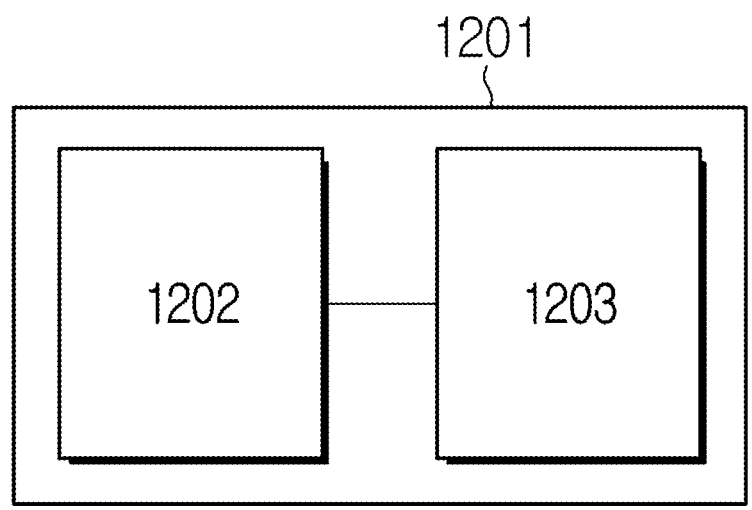
FIG. 12 is a view illustrating an apparatus for identifying music in a content according to an embodiment of the present disclosure.

In an embodiment, the original audio fingerprint extractor of FIG. 2 and the content audio fingerprint extractor of FIG. 3 may be represented as one music identification apparatus and be included, for example, in an apparatus for identifying music in a content, which is illustrated in FIG. 12.

Meanwhile, processes of music separation, music resynthesis and music fingerprint extraction, which may be implemented by the original audio fingerprint extractor 201 and/or the content audio fingerprint extractor 301, will be described in further detail below with reference to FIG. 4 to FIG. 6.

Figure 4:
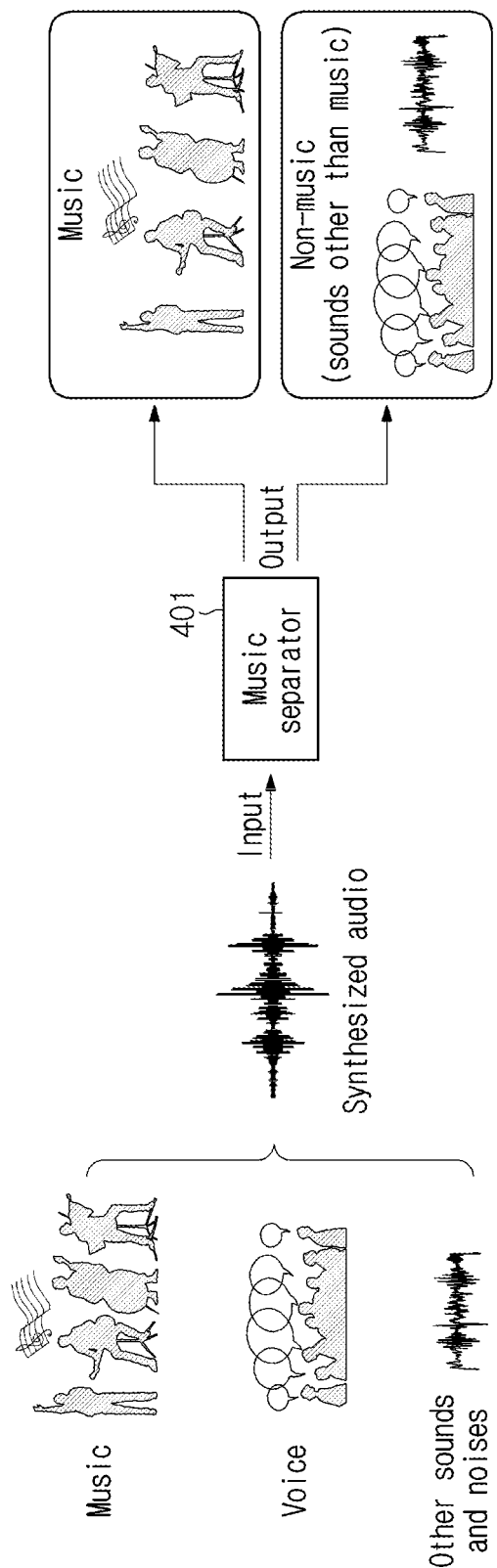
FIG. 4 is a view illustrating a process of separating music according to an embodiment of the present disclosure.
Figure 5:
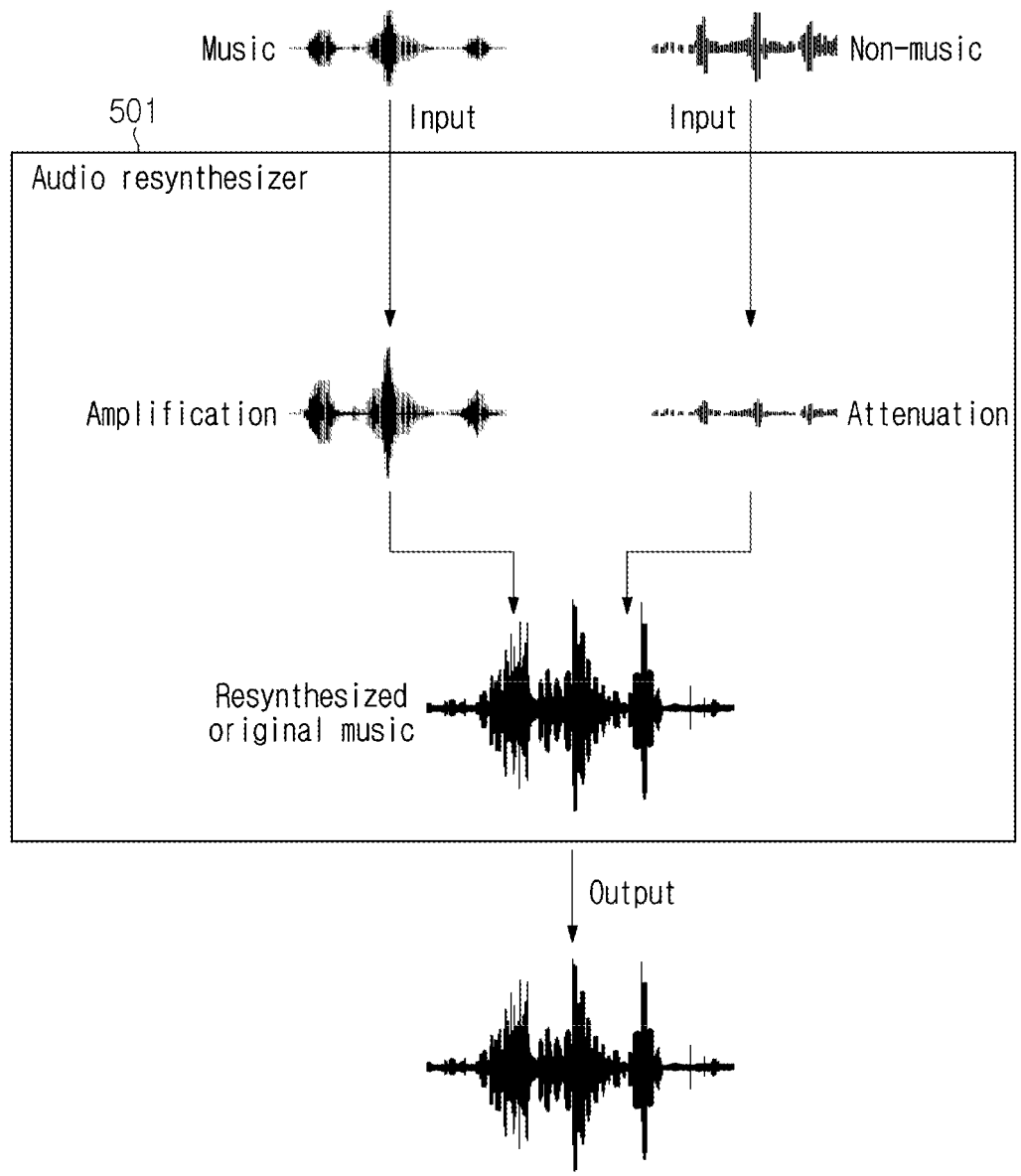
FIG. 5 is a view illustrating a process of resynthesizing audio data of a music signal and a non-music signal according to an embodiment of the present disclosure.
Figure 6:
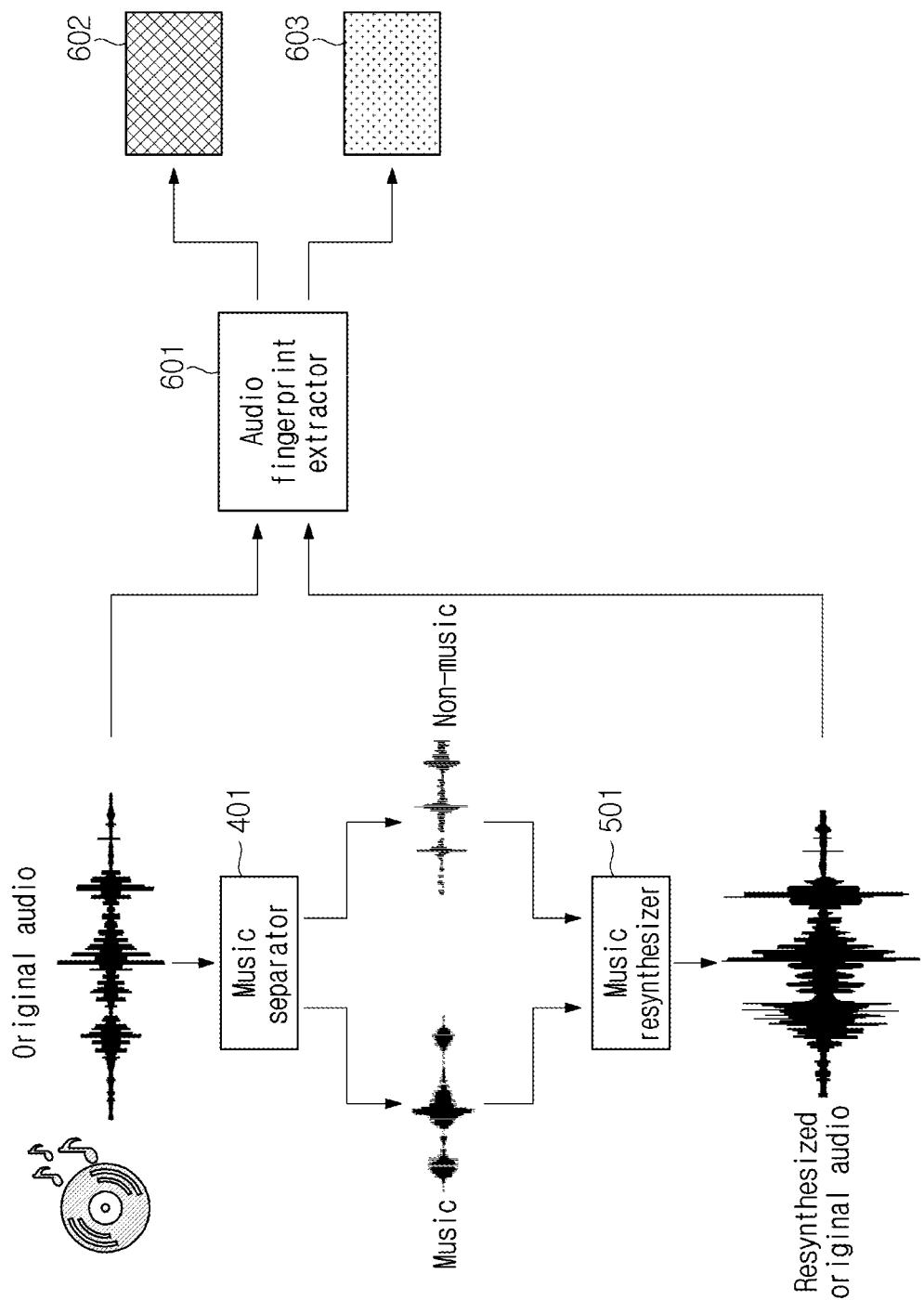
FIG. 6 is a view illustrating a process of extracting an audio fingerprint according to an embodiment of the present disclosure.

FIG. 4 is a view illustrating a process of separating music according to an embodiment of the present disclosure, FIG. 5 is a view illustrating a process of resynthesizing an audio of a music signal and a non-music signal according to an embodiment of the present disclosure, and FIG. 6 is a view illustrating a process of extracting an audio fingerprint according to an embodiment of the present disclosure.

In an embodiment, the process of separating music in FIG. 4 may be implemented by the music separator and an apparatus for identifying music in a content, which are disclosed in FIG. 2, FIG. 3 and a drawing below, and may be included in a method for identifying music in a content. In addition, the process of resynthesizing an audio in FIG. 5 may be implemented by the music resynthesizer or an apparatus for identifying music in a content, which are disclosed in FIG. 2, FIG. 3 and a drawing below, and may be included in a method for identifying music in a content. Likewise, FIG. 6 may be implemented by the audio fingerprint extractor or an apparatus for identifying music in a content, which are disclosed in FIG. 2, FIG. 3 and a drawing below, and may be included in a method for identifying music in a content.

As an example, first, the process of separating music may be implemented by a music separator 401. As an example, the music separator may receive a synthesized audio as an input, which includes at least one of music, voice and another type of sound (noise), and may separate the synthesized audio into a music signal and a non-music signal. When the two audio datasets thus separated are combined, they may be the same as the original input audio. Meanwhile, the synthesized audio as input audio may be an audio in a content or an original audio and may be represented by a mono channel with a single corresponding channel, a stereo channel with 2 corresponding channels, or more channels. As an example, a mono channel-based music separation technique using an artificial neural network, deep learning and the like may be applied for separating a music signal and a non-music signal, but the present disclosure is not limited thereto. As an example, an artificial neural network may include a convolutional neural network.

Meanwhile, in an embodiment, although the music separator 401 performs music/non-music signal separation of audio data, it may not perfectly separate a music signal and a non-music signal. For example, a separated music signal consists mostly of music signals but may include some non-music signals, and some of music signals to be included may be excluded and be included in a non-music signal. Compared with a music signal included in input audio data, a separated music signal may be partially damaged so that sound quality may be relatively damaged. Likewise, a separated non-music signal may include some music signals, and some of non-music signals may be included in a music signal. As an example, when a music signal to be separated is included in audio data and is a main sound (foreground sound) in an input audio, a separation result may be clear, and on the other hand, when the music signal is not a main sound (background sound), a separation result may be a little worse. As an example, when an input audio is an audio of a video content, as a dialog is an important audio in such a video content as a drama and a film, background music may be synthesized so low as not to hinder the dialog from being clearly heard. Accordingly, when music/non-music signals are separated in background music of a video content as an input audio, the separation may not be clearly performed. That is, from the perspective of signal, since a music signal obtained through a music separation process may be distorted, a fingerprint extracted from the separated music signal may be different from a fingerprint of an original music signal.

Herein, when the music signal and non-music signal obtained by the music separator 401 of FIG. 4 are input into an audio resynthesizer 501 of FIG. 5, such a difference may be attenuated. In the audio resynthesizer 501, after separation of music/non-music signals, a separated music signal may be amplified and a separated non-music signal may be attenuated. Then, the two datasets may be synthesized again to generate resynthesized audio data. That is, when an original music signal is a background sound, it may become a relatively louder foreground sound in resynthesis, and another audio like a dialog, which was originally a foreground sound, may become a relatively quieter background sound.

As an example, it is assumed that the processes of FIG. 4 and FIG. 5 are applied to original audio data. That is, it is assumed that an input audio of the music separator 401 is original audio data and resynthesized original audio data is generated through the music separator 401 and the audio resynthesizer 501. In this case, according to the process of extracting a music fingerprint in FIG. 6, both the original audio data and the resynthesized original audio data may be inputs of an audio fingerprint extractor 601. The audio fingerprint extractor 601 may extract a fingerprint 602 for the original audio and a fingerprint 603 for the resynthesized original audio respectively. When extracting an audio fingerprint, if a music signal is a relatively loud sound, the music signal may have robustness even after being synthesized with another sound. In this way, an identification accuracy may be significantly improved by attenuating loss of a music signal and changing background music to foreground music.

Figure 7:
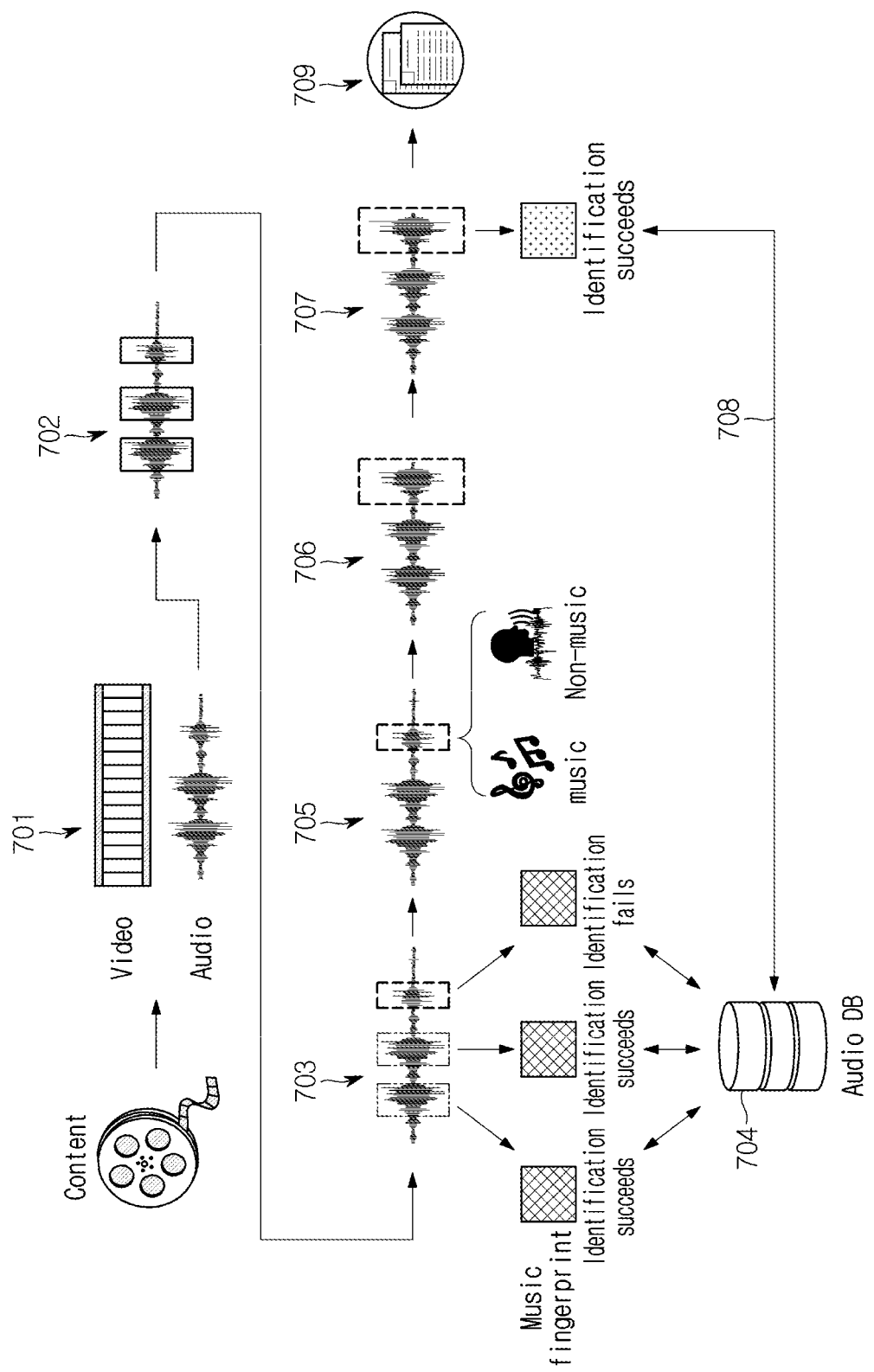
FIG. 7 is a view illustrating a process of identifying music in a content according to an embodiment of the present disclosure.

FIG. 7 is a view illustrating a process of identifying music in a content according to an embodiment of the present disclosure. As an example, for clarity of description, it is assumed that music is identified in a video content, but the present disclosure is not limited thereto.

Figure 11:
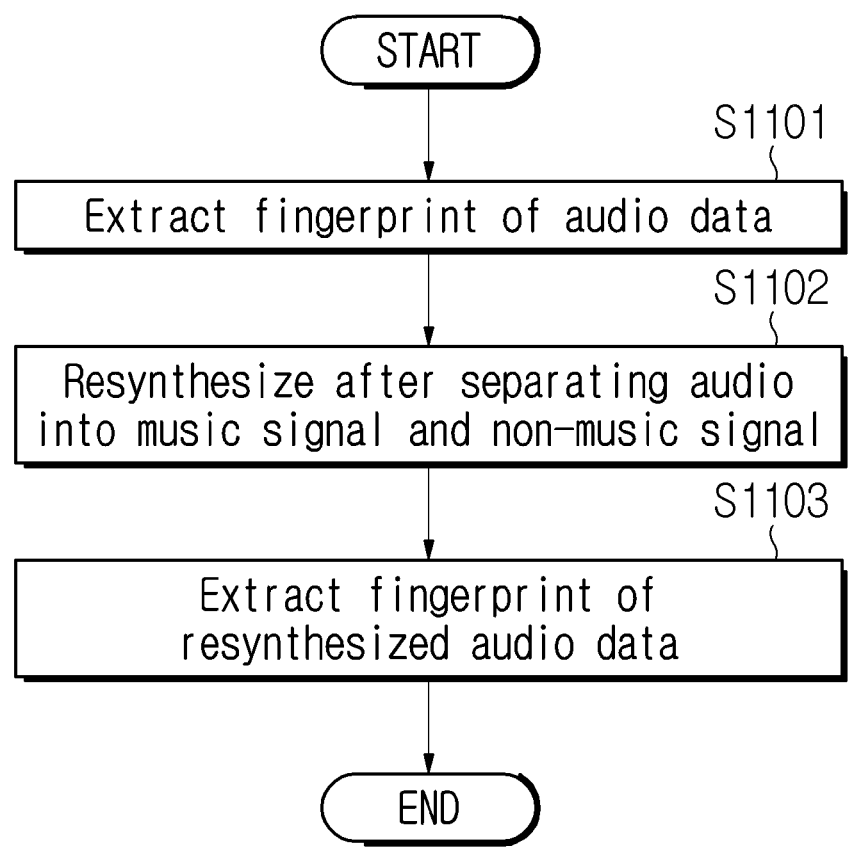
FIG. 11 is a view illustrating a method for identifying music in a content according to an embodiment of the present disclosure.

In an embodiment, the process of identifying music in a content according to FIG. 7 may be included in a description referring to another drawing, be implemented by an apparatus for identifying music in a content (e.g., FIG. 12), and be included in a method for identifying music in a content (e.g., FIG. 11). In addition, it may be implemented by a content audio fingerprint extractor of FIG. 3. However, the present disclosure is not limited thereto.

In an embodiment, a content including a video content and a music content may be given as an input. For example, when a video content is input, it may be separated (701) first into a video stream and an audio stream.

The audio stream thus obtained may be analyzed so that a section(s) where music is played may be detected (702). As an example, audio sections, in which music is played, may be detected from the audio stream by means of an artificial neural network, and deep learning and other techniques may be used.

Next, for an audio in a content of each detected audio section 702, where music is played, a fingerprint may be extracted (703). Audio identification (704) may be performed by querying fingerprints thus extracted from each audio section in an audio fingerprint DB. As for this, as described with reference to another drawing, a corresponding fingerprint stored in the audio fingerprint DB may be retrieved.

When the audio identification 704 is performed, if there is an audio section in which no music is identified, the audio section (that is, the audio section in which identification fails) may be separated (705) into a music signal and a non-music signal. As described with reference to another drawing, this may be implemented by a music separator or an apparatus for identifying music.

When the audio section is separated into a music signal and a non-music signal, audio data may be resynthesized (706) using the music signal and the non-music signal. Herein, the resynthesis may be performed by amplifying the music signal and attenuating the non-music signal.

When a fingerprint of the resynthesized audio data is extracted (707), the extracted audio fingerprint may be searched for and queried in an audio fingerprint DB in order to find a corresponding fingerprint. Thus, music identification may be performed (708).

As an example, an overall music identification result may be output (709) by integrating information on an audio section, which is obtained in a process of audio identification (704) and in which music is identified, and information on an audio section, which is obtained in a process of music identification (708) and in which music is identified.

Figure 8:
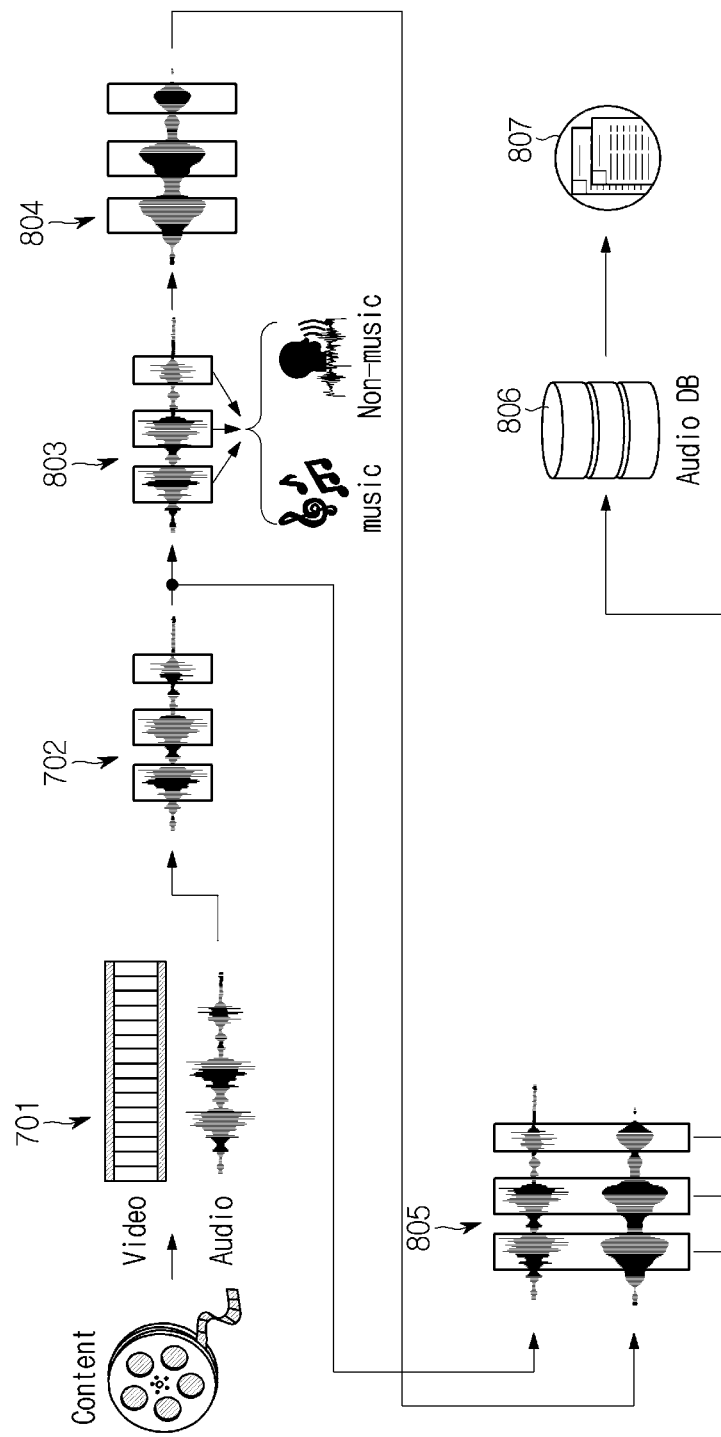
FIG. 8 is a view illustrating a process of identifying music in a content according to another embodiment of the present disclosure.

FIG. 8 is a view illustrating a process of identifying music in a content according to another embodiment of the present disclosure. As an example, for clarity of description, it is assumed that music is identified in a video content, but the present disclosure is not limited thereto.

In an embodiment, the process of identifying music in a content according to FIG. 8 may be included in a description referring to another drawing, be implemented by an apparatus for identifying music in a content (e.g., FIG. 12), and be included in a method for identifying music in a content (e.g., FIG. 11). In addition, it may be implemented by a content audio fingerprint extractor of FIG. 3. However, the present disclosure is not limited thereto.

As an example, for an input image content, a video stream and an audio stream may be separated (701) first. Next, the audio stream thus obtained may be analyzed so that audio sections, in which music is played, may be detected (702). For example, an audio section(s) in which music is played may be detected based on a deep learning method using an artificial neural network. This may be the same as described with reference to FIG. 7.

In an embodiment, each audio section in which music is played may be separated (803) into a music signal and a non-music signal. As described with reference to another drawing, this may be implemented by a music separator or an apparatus for identifying music. Audio may be resynthesized (804) using the separated music/non-music signals. Herein, the resynthesis may be performed by amplifying the music signal and attenuating the non-music signal.

From the audio 702 in a content and the resynthesized audio 804, which are input for the detected (702) audio section(s) in which music is played, fingerprints may be extracted (805) respectively. The two fingerprints thus extracted may be generated as one combined type of data.

Accordingly, music identification 806 is performed through search and query of an audio fingerprint DB using the combined type of fingerprints thus generated. Herein, the audio fingerprint DB includes the audio fingerprint DB described in FIG. 9, and a fingerprint matching unit, which may be included in the audio fingerprint DB, may find a most similar fingerprint by comparing the queried music fingerprint not only with a fingerprint of an original audio stored in the audio fingerprint DB but also with a fingerprint of a resynthesized original audio.

Music information identified through a fingerprint query of each audio section, in which music is played, may be integrated through the music identification 806 so that an overall music identification result 807 may be output.

Figure 9:
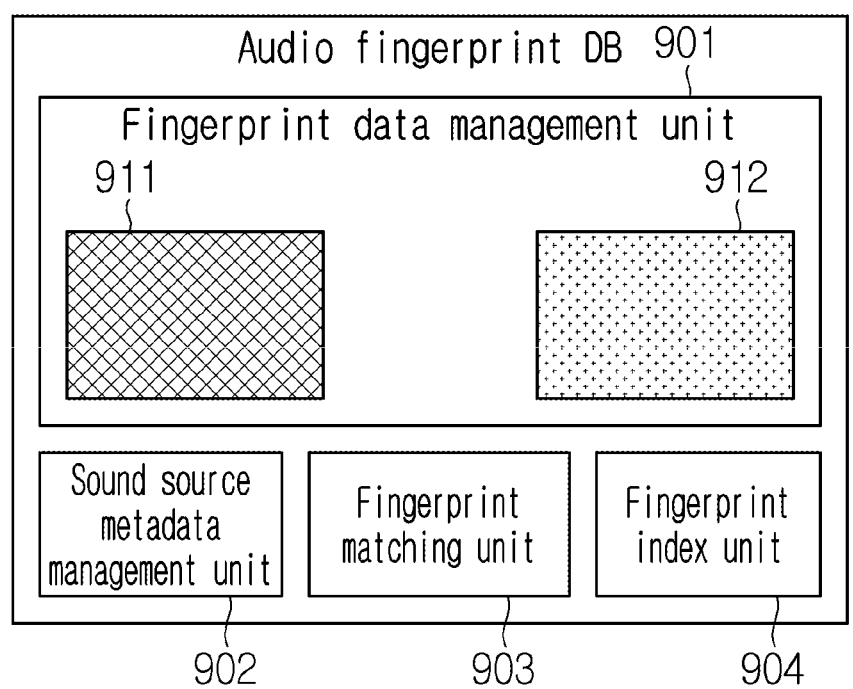
FIG. 9 is a view illustrating a configuration of an audio fingerprint DB according to an embodiment of the present disclosure.
Figure 10:
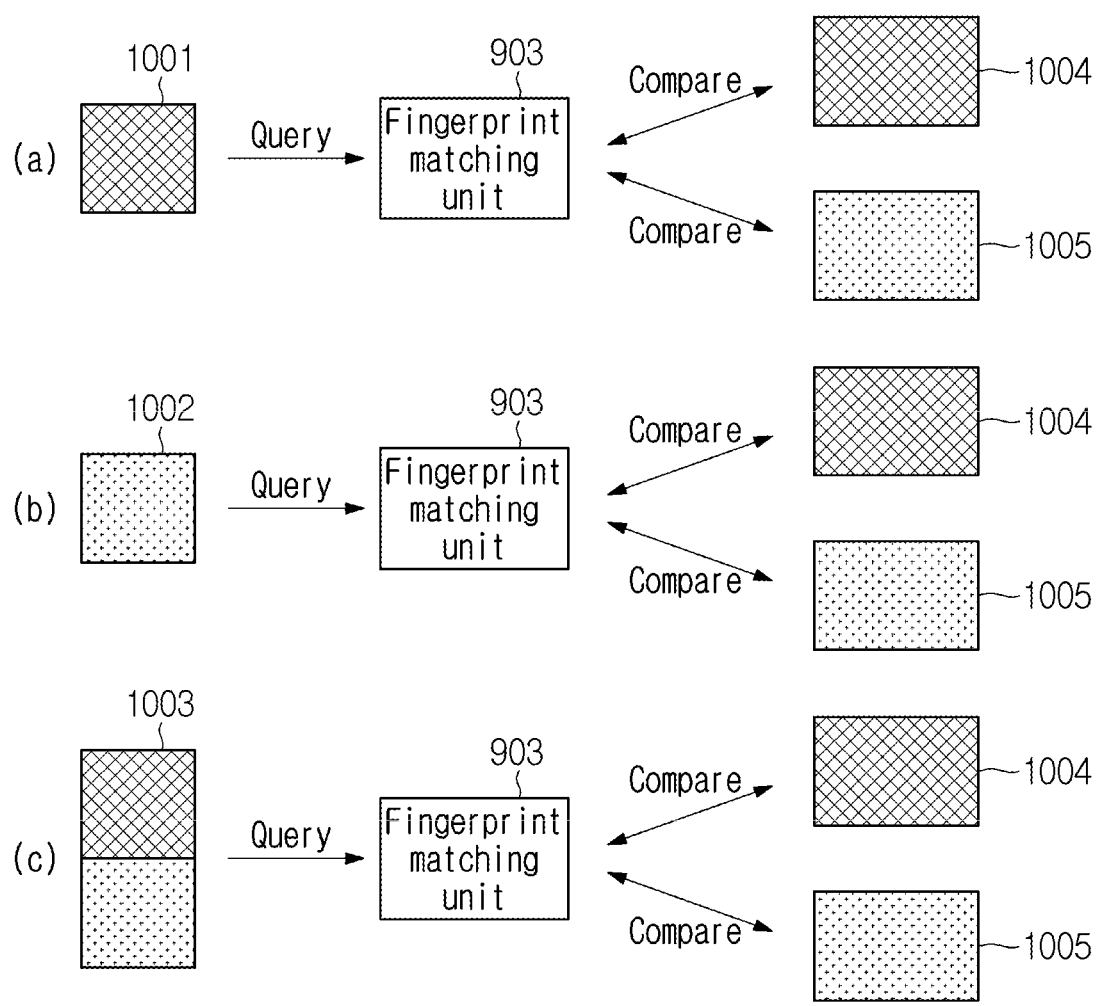
FIG. 10 is a view illustrating a process of searching for an audio fingerprint according to an embodiment of the present disclosure.

FIG. 9 is a view illustrating a configuration of an audio fingerprint DB according to an embodiment of the present disclosure, and FIG. 10 is a view illustrating a process of searching for an audio fingerprint according to an embodiment of the present disclosure.

In an embodiment, the process of searching for an audio fingerprint in FIG. 10 may be implemented by the content audio fingerprint extractor of FIG. 3, the apparatus for identifying music in a content in FIG. 12 and/or the fingerprint matching unit 903 of FIG. 9. Hereinafter, the process is performed by the fingerprint matching unit 903 of FIG. 9, but the present disclosure is not limited thereto.

As an example, an audio fingerprint DB 901 may be a fingerprint DB and include a fingerprint data management unit 901, a sound source metadata management unit 902, a fingerprint matching unit 903, and a fingerprint index unit 904.

In an embodiment, the fingerprint data management unit 901 may store at least one of fingerprint data 911 for an original audio and fingerprint (data) 912 for a resynthesized original audio. As an example, when both the fingerprint data are stored, they may be managed by being mapped since they are related to the same original audio. As an example, the original audio fingerprint data 911 and the fingerprint (data) 912 for the resynthesized original audio may be extracted by the original music fingerprint extractor of FIG. 2 or be extracted by the apparatus for identifying music in a content in FIG. 12, but the present disclosure is not limited thereto.

As an example, the sound source metadata management unit 902 may store and manage information on each original audio such as a song title, a singer, a producer and/or a date of release.

As an example, the fingerprint matching unit 903 may perform a function of finding a most similar fingerprint by comparing a fingerprint of an audio in a content, which is searched for and queried for retrieval in an audio fingerprint DB, and a fingerprint stored in the fingerprint data management unit 901. Meanwhile, this function may be provided in an audio fingerprint DB or through an external music identification apparatus, but the present disclosure is not limited thereto.

Meanwhile, as shown in FIG. 10, the fingerprint matching unit 903 may compare fingerprints between fingerprint data 1004 (911 of FIG. 9) for an original audio and fingerprint data 1005 (912 of FIG. 9) for a resynthesized original audio. Specifically, as shown in (a) of FIG. 10, the fingerprint 1001 extracted from an audio in a content (e.g., video content) may be compared with the fingerprint 1004 and 1005, and as shown in (b) of FIG. 10, the fingerprint 1002 extracted from an audio in a resynthesized music content may be compared with the fingerprint 1004 and 1005. In addition, as shown in (c) of FIG. 10, a fingerprint 1003, a combined type of the fingerprint 1001 of (a) and the fingerprint 1002 of (b), may be input and be compared with the two fingerprints 1004 and 1005. As an example, fingerprint data may be stored in a fingerprint data management unit.

The fingerprint index unit 904 may perform a function of generating and managing index data referring to similar fingerprints in order to enable the fingerprint matching unit 903 to match the fingerprints quickly. For example, when fingerprint data for original audio data and resynthesized original audio data respectively are all stored in an audio fingerprint DB, both fingerprint data may be mapped and managed since they are related to the same original audio. Thus, index data may be assigned.

FIG. 11 is a view illustrating a method for identifying music in a content according to an embodiment of the present disclosure. Specifically, FIG. 11 illustrates a method for extracting a fingerprint in a content for identifying music in the content according an embodiment of the present disclosure.

As an example, the method for identifying music in a content, as illustrated in FIG. 11, may be implemented by an original audio fingerprint extractor including the example of FIG. 2, a content audio fingerprint extractor including the example of FIG. 3 and/or an apparatus for identifying music in a content including the example of FIG. 12, but the present disclosure is not limited thereto.

In an embodiment, when describing the example of FIG. 11, audio data may include original audio data and content audio data.

As an example, when audio data is original audio data, a fingerprint of the original audio data may be extracted (S1101). Herein, the extracted fingerprint may be stored in an audio fingerprint DB. The original audio data may be separated into a music signal and a non-music signal and then be resynthesized (S1102). In addition, a fingerprint of the resynthesized original audio may be extracted (S1103). As an example, the extracting (S1101) of the fingerprint of the original audio may include extracting a fingerprint of the original audio, the resynthesizing after separation (S1102), and the extracting of the fingerprint (S1103). In an embodiment, the resynthesizing (S1102) may include synthesizing by amplifying a music signal and attenuating a non-music signal of the original audio. As an example, a fingerprint of the original audio may be managed by being mapped with a fingerprint of a resynthesized original audio in an audio fingerprint DB.

As another example, when an audio (data) is an audio (data) in a content, a fingerprint of the audio (data) in the content (e.g., n-th audio, n is a random number) may be extracted (S1101). Herein, the audio data in the content may be an audio of a section of the content, in which music is played. The audio data in the content may be separated into a music signal and a non-music signal and then be resynthesized (S1102). In addition, a fingerprint of the resynthesized audio in the content may be extracted (S1103). As an example, the extracting (S1101) of the fingerprint of the audio in the content may include extracting a fingerprint of the audio in the content, the resynthesizing after separation (S1102), and the extracting of the fingerprint (S1103). In an embodiment, the resynthesizing (S1102) may include synthesizing by amplifying a music signal and attenuating a non-music signal of the audio in the content. As an example, respective fingerprints of an audio in a content and/or a resynthesized audio in the content may be searched for a fingerprint of an original audio and/or a resynthesized original audio fingerprint. Herein, as mentioned above, the fingerprint of the original audio and/or the resynthesized original audio fingerprint may be stored in an audio fingerprint DB. Meanwhile, when describing the embodiment, a fingerprint of an audio in a content may be used in a meaning including a fingerprint of an audio in a content resynthesized after separating a music signal and a non-music signal for the audio in the content.

Meanwhile, an audio fingerprint DB may include audio metadata including at least one of a name of an original audio, a date of release, a singer, and a producer. In addition, an input content including an audio may have a mono channel, a stereo channel, or a more multichannel. In addition, a detected music section may be detected using an artificial neural network in a content. In addition, an artificial neural network may be used to separate a music signal and a non-music signal in an audio of a content, and the artificial neural network may be based on a deep learning method. In addition, when separating a music signal and a non-music signal, it is possible to apply a method for music/non-music signal separation using a mono channel as an input. For example, such a method may be based on a convolutional neural network. However, the present disclosure is not limited thereto.

Meanwhile, in FIG. 11, a fingerprint of audio data is extracted first and then a fingerprint of resynthesized audio data generated through the separation and resynthesis of audio data is extracted, but the present disclosure is not limited thereto. That is, some steps may be added or removed, or an order of each step may be changed. For example, after audio data is separated into a music signal and a non-music signal first, fingerprints of resynthesized audio data and audio data may be extracted at the same time. In addition, as another example, as described with reference to another drawing, after a fingerprint for audio data is extracted first, search and query may be performed in an audio fingerprint DB, and then separation and resynthesis may be performed only for an audio which is not successfully identified, and search and query may also be performed in the audio fingerprint DB by using a combined form of an audio fingerprint and a fingerprint of a resynthesized audio.

FIG. 12 is a view illustrating an apparatus for identifying music in a content according to an embodiment of the present disclosure. As an example, an apparatus 1201 for identifying music in a content may include a component 1202 and another component 1203, and as an example, the component 1202 may be a memory configured to store data, a transceiver configured to transmit and receive data, and the like, and the component 1203 may be a processor 1203 configured to control the memory or the transceiver.

In an embodiment, the apparatus 1201 for identify music in a content may include the above-described audio fingerprint DB. As mentioned above, the audio fingerprint DB may include a fingerprint data management unit, a sound source metadata management unit, a fingerprint matching unit, and/or a fingerprint index unit, and the audio fingerprint DB of FIG. 9 may be included.

In addition, as an example, the apparatus 1201 for identifying music in a content may implement the processes of FIG. 7, FIG. 8, FIG. 10 and FIG. 11 and may include the fingerprint extractors of FIG. 2 and FIG. 3. In addition, the apparatus 1201 may provide the functions of FIG. 4 to FIG. 6.

In an embodiment, when the component 1203 is a processor, it may provide the functions provided by the music fingerprint extractor, the music identifier, the music separator, the audio resynthesizer, the fingerprint generator, and the music section detector, which are mentioned above.

For example, the processor may extract a fingerprint of an original audio, store the fingerprint in an audio fingerprint DB, extract a fingerprint of an audio in a content, and search for a fingerprint corresponding to the fingerprint of the audio in the content in the audio fingerprint DB. A first audio may be audio data included in a music section detected in a content. In addition, the processor may extract a fingerprint of an original audio, separate a music signal and a non-music signal in the original audio and then resynthesize the original audio, and extract a fingerprint of the resynthesized original audio. In addition, the processor may resynthesize the original audio by amplifying the music signal and attenuating the non-music signal. In addition, the processor may map the fingerprint of the original audio with the fingerprint of the resynthesized original audio. In addition, when searching for a fingerprint of an audio in a content, the processor may search for both a fingerprint of the original audio and the resynthesized original audio fingerprint. For example, such a search may be performed in an audio fingerprint DB. In addition, a fingerprint of an audio in a content may include not only a fingerprint of the audio in the content, as it is before resynthesis, but also a fingerprint of a resynthesized audio in the content after the separation of a music signal and a non-music signal in the audio in the content. In addition, the fingerprint of the resynthesized audio in the content may be generated by amplifying the separated music signal and attenuating the separated non-music signal and then synthesizing the music signal and the non-music signal. In addition, a music section detected to include music in a content may be detected using an artificial neural network in the content, and this method may be based on a deep learning technique.

Meanwhile, an additional component other than the components 1202 and 1203 illustrated in FIG. 12 may be included, and one component may be included in another component, but the present disclosure is not limited thereto.

According to the present disclosure, it is possible to identify background music included in various contents such as video contents, especially, dramas, entertainment programs, news and other TV program contents, voice contents and music contents. Specifically, even when a noise other than music is included in a content or when music used in a content is background music or foreground music, it is possible to identify a type of music. In addition, details of music used in a content may be automatically generated by specifying a section, in which the music is used, from a whole section. The details of use of music in a content may be utilized to calculate royalty. For example, details of use of music in broadcasting contents may be utilized as data for distributing royalty of music used for broadcasting. In addition, the present disclosure may be applied for identifying a music content in a loud place.

The various embodiments of the present disclosure do not list all possible combinations, but are intended to illustrate representative aspects of the present disclosure, matters described in various embodiments may be applied independently or in combination of two or more.

In addition, various embodiments of the present disclosure may be implemented by hardware, firmware, software, or a combination thereof. It may be implemented by a combination of one or more software rather than one software, and one subject may not perform all processes. For example, a deep learning process that requires a high degree of data computing power and a large amount of memory is performed in the cloud or server, and the user side may be implemented by using only an artificial neural network in which deep learning has been completed, but it is self-evident that it is not limited thereto.

For implementation by hardware, one or more application specific Integrated Circuits (ASICs), Digital Signal Processors (DSPs), Digital Signal Processing Devices (DSPDs), Programmable Logic Devices (PLDs), Field Programmable Gate Arrays (FPGAs), general processor, a controller, a microcontroller, a microprocessor, and the like. For example, it may take various forms including the general-purpose processor. It is apparent that hardware may be disclosed in combination of one or more.

The scope of the present disclosure includes software or machine-executable instructions (eg, operating system, application, firmware, program, etc.) that cause an operation according to the method of various embodiments to be executed on a device or computer, and such software or and non-transitory computer-readable media in which instructions and the like are stored and executed on a device or computer.

As an embodiment, the computer program stored in the non-transitory computer-readable medium according to an embodiment of the present disclosure includes, in the computer, extracting the fingerprint of the original audio and storing it in the audio fingerprint DB, including in the content extracting a fingerprint of the first audio and searching the audio fingerprint DB for a fingerprint corresponding to the fingerprint of the first audio, wherein the first audio is audio data in a music section detected from the content.

Meanwhile, the contents described with reference to each drawing are not limited to each drawing, and as long as there is no contradiction, they may be applied complementary to each other.

The present disclosure described above can be various substitutions, modifications and changes within the scope that does not depart from the technical spirit of the present disclosure for those of ordinary skill in the art to which the present disclosure pertains, so the scope of the present disclosure is It is not limited by one embodiment and the accompanying drawings.

What is claimed is:

1. A method for identifying music in a content, the method comprising:
   extracting and storing a fingerprint of an original audio comprising synthesized audio in an audio fingerprint database (DB);
   extracting a fingerprint of a first audio in the content; and
   searching for a fingerprint corresponding to the fingerprint of the first audio in the audio fingerprint DB,
   wherein the first audio is audio data in a music section detected from the content,
   wherein extracting and storing the fingerprint of the original audio in the audio fingerprint DB comprises:
      extracting the fingerprint of the original audio;
      resynthesizing the original audio after separating a music signal and a non-music signal of the original audio, wherein the resynthesizing comprises synthesizing by amplifying the music signal and by attenuating the non-music signal; and
      extracting a fingerprint of the resynthesized original audio, and
   wherein the fingerprint of the original audio is mapped with the fingerprint of the resynthesized original audio in the audio fingerprint DB.

2. The method of claim 1, wherein searching for the fingerprint comprises searching both for the fingerprint of the original audio and the fingerprint of the resynthesized original audio.

3. The method of claim 1, wherein the fingerprint of the first audio comprises a fingerprint of the first audio after the music signal and the non-music signal of the first audio are separated.

4. The method of claim 3, wherein the fingerprint of the first audio is generated by synthesizing after amplifying the music signal and attenuating the non-music signal.

5. The method of claim 1, wherein the audio fingerprint DB comprises audio metadata that comprises at least one of a name of the original audio, a date of release, a singer, and a producer.

6. The method of claim 1, wherein the content has a mono channel, a stereo channel, or more than two channels.

7. The method of claim 1, wherein the detected music section is detected using an artificial neural network in the content.

8. An apparatus for identifying music in a content, the apparatus comprising:
   a memory configured to store data; and
   a processor configured to control the memory,
   wherein the processor is further configured to:
   extract and store a fingerprint of an original audio comprising synthesized audio in an audio fingerprint database (DB),
   extract a fingerprint of a first audio in the content, and
   search for a fingerprint corresponding to the fingerprint of the first audio in the audio fingerprint DB,
   wherein the first audio is audio data in a music section detected from the content, and
   wherein the processor is further configured to:
      extract the fingerprint of the original audio;
      resynthesize the original audio after separating a music signal and a non-music signal of the original audio by amplifying the music signal and attenuating the non-music signal; and extract a fingerprint of the resynthesized original audio, and wherein the processor is further configured to map the fingerprint of the original audio with the fingerprint of the resynthesized original audio.

9. The apparatus of claim 8, wherein the processor is further configured to, when searching for the fingerprint, search both for the fingerprint of the original audio and for the fingerprint of the resynthesized original audio.

10. The apparatus of claim 8, wherein the fingerprint of the first audio comprises a fingerprint of the first audio after the music signal and the non-music signal of the first audio are separated.

11. The apparatus of claim 10, wherein the fingerprint of the first audio is generated by synthesizing after amplifying the music signal and attenuating the non-music signal.

12. The apparatus of claim 8, wherein the content has a mono channel, a stereo channel, or more than two channels.

13. The apparatus of claim 8, wherein the detected music section is detected using an artificial neural network in the content.

14. A computer program stored in a non-transitory computer-readable medium, the computer program implementing in a computer:

extracting and storing a fingerprint of an original audio comprising synthesized audio in an audio fingerprint database (DB);

extracting a fingerprint of a first audio in a content; and searching for a fingerprint corresponding to the fingerprint of the first audio in the audio fingerprint DB, wherein the first audio is audio data in a music section detected from the content, wherein extracting and storing the fingerprint of the original audio in the audio fingerprint DB comprises:

extracting the fingerprint of the original audio;

resynthesizing the original audio after separating a music signal and a non-music signal of the original audio, wherein the resynthesizing comprises synthesizing by amplifying the music signal and by attenuating the non-music signal; and extracting a fingerprint of the resynthesized original audio, and wherein the fingerprint of the original audio is mapped with the fingerprint of the resynthesized original audio in the audio fingerprint DB.

* * * * *